Oct. 10, 1944. H. CAMINEZ 2,360,047
MEANS FOR COILING INSERTS
Filed Jan. 31, 1942 4 Sheets-Sheet 1

INVENTOR.
HAROLD CAMINEZ
BY Walter S. Bleston
ATTORNEY

Oct. 10, 1944.        H. CAMINEZ        2,360,047
MEANS FOR COILING INSERTS
Filed Jan. 31, 1942        4 Sheets-Sheet 2

INVENTOR.
HAROLD CAMINEZ
BY Walter S. Polerton
ATTORNEY

Patented Oct. 10, 1944

2,360,047

UNITED STATES PATENT OFFICE 2,360,047

MEANS FOR COILING INSERTS

Harold Caminez, Williamsport, Pa., assignor to Aircraft Screw Products Company, Inc., Long Island City, N. Y., a corporation of New York Application January 31, 1942, Serial No. 429,023

14 Claims. (Cl. 153—67)

The present invention relates to a means for making wire coil inserts such as have been frequently suggested for use in screw connections of a male and a female member, wherein the coil wire is in engagement with the external and internal threadings of the respective members. The invention relates more particularly to such inserts coiled of a wire whose symmetrical cross-section is other than circular, as described for instance in my U. S. Patent No. 2,150,876.

Whereas ordinary coil springs in general require only a certain degree of homogeneousness and exactness of the dimensions of the wire material of which the coil is made, and also a certain degree of exactness as to the external and internal dimensions of the finished coil, inserts of the type here under consideration must have, in addition to the features of a coil spring, an unusually high grade of exactness regarding the desired cross-section and pitch of the wire in the finished article. The invention aims, therefore, to provide a means whereby a wire coil can be made so as to fulfil the requirements of an insert for a screw connection. The means according to the invention comprises a machine for producing inserts exact to measure and with a tang which may be gripped by a tool when the coil is to be inserted in a threaded female member.

The wire useful for an insert coil must be hard but ductile and of good resiliency. The material should be anti-corrosive and must have low friction qualities with respect to the materials of the members of the connection for which the insert is destined. In certain cases it must also be resistant to the attack by the products of combustion in gas engines. Materials such as a hard bronze and stainless steel have been found particularly suited to the purpose. The wire cross-section of the insert may be round or square or it may be one of those which have a pair of side portions converging towards a line of symmetry, as for instance, a cross-section of diamond shape or of pear shape as described in my afore-mentioned Patent No. 2,-150,876, depending on the cross-sections of the threads in the female and male members in which the insert is intended to be used. In the finished insert the wire must be smooth and closely fit the thread grooves of the male and female members, and particularly in wire cross-sections of the last-mentioned shapes, the line of symmetry of any cross-section must be coincident with a radius of the coil. Generally, the outer diameter of the insert must be larger than the tapped hole so as to have adequate spring tension but must not be too large so as to render insertion difficult or even impossible. At least the front half of the first convolution must be undersized to facilitate the insertion, and it is recommended to apply a notch close to the root of the tang where the latter may be broken off after the insertion.

In coiling wire of any cross-section, the originally more or less straight wire is bent into helical convolutions. The bending stresses to which it is subjected in that operation change the original cross-section if the coil is wound in the customary manner with the result that an originally round cross-section will no longer be circular in the finished coil, and that an originally square cross-section will no longer be rectangular owing to the compression of the inner portions and to the tension of the outer portions. Furthermore, it must be taken into consideration that wire shipped as usual, i. e., spooled on drums or reels of not very large diameter, is bent from the start and owing thereto has what is generally termed a "cast," that means the particles of the wire which should be arranged, so to say, in straight lines parallel to the wire axis, actually form large-pitched helices. In a round wire such cast is immaterial. However, in wires of other cross-sections, particularly in diamond or pear-shaped wires, a cast would cause a tilt of the convolutions of the finished insert and, therefore, render the wire unfit for the contemplated purpose. The method and means according to my invention are useful in producing inserts complying with the enumerated requirements and in avoiding the drawbacks occurring in the conventional manner of coiling wire.

Since I have found that inserts of the last-mentioned cross-sections are among the most difficult ones to produce, I shall describe the method and means according to my invention mainly with reference to a pear-shaped wire whose cross-section can be approximately defined as a triangle with rounded or truncated top and with a base coinciding with the chord of a segment of a circle. However, I wish it to be understood that this method with or without slight variations or modifications is equally well applicable to wire of other cross-sections, as for instance, diamond-shaped or square wire, and that the scope of my invention shall not be limited but by the appended claims.

Further objects and details of my invention will be apparent from the description given hereinafter and the accompanying drawings illustrating embodiments thereof by way of example.

Figures 1, 2, 5, 10:
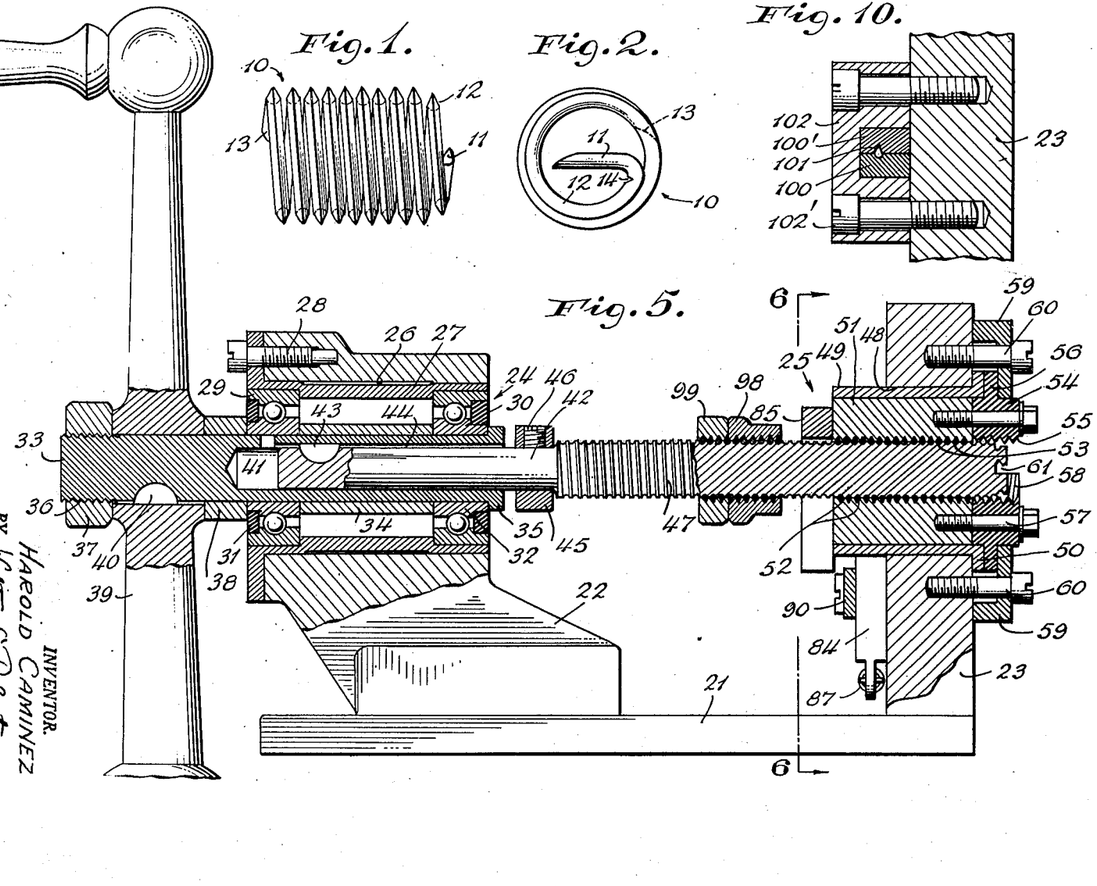
Figs. 1 and 2 are a side elevation and a front plan view respectively of an insert of the type under consideration.
Fig. 5 is a longitudinal section of the coiling device along line 5—5 of Fig. 3.
Fig. 10 is a section along line 10—10 of Fig. 3 and illustrating the wire guide.

No matter whether the wire cross-section of the insert to be produced is such as shown in Figs. 1 and 2, or whether another cross-section, e. g., a diamond-shaped one, is desired, it is advisable to start from a circular cross-section wire. If the material is a stainless steel containing, e. g., 18% chromium and 8% nickel, the wire may be first annealed, pickled and then cleaned and provided with an oxide coating; the cleaning step of operation to take place also if the material is a suitable bronze. The clean wire is reduced in diameter by drawing it through a die preferably of one of the carbide materials, as for instance, a die of the material which is on the market under the name of "Carboloy." This cold working simultaneously smoothens the surface and increases the tensile strength, e. g., from 90,000 p. s. i. in the annealed wire to 150,000 p. s. i. in the wire of reduced diameter. Any flaws in the original wire will also be detected during this step of operation. The required size to which the wire is to be reduced can be experimentally determined. The wire is then provided with another oxide coating by heating.

The so-prepared round wire of stainless steel, or if the material is a bronze, the wire cleaned and reduced to the required size and having the desired qualities is then shaped by drawing it through grooved rollers which are so adjustable that the wire thickness can be controlled. For measuring the thickness of a wire of other than circular or square cross-section I found a micrometer useful which has a lower and an upper anvil, each grooved to match the desired shape of wire.

For the reasons hereinbefore given, the shape to which the wire is drawn by the last-mentioned drawing operation must be slightly different from that required in the finished insert to compensate for later changes owing to the coiling. This difference can be experimentally established. If a wire-shape as of Figs. 1 and 2 is desired in the insert, the angle of the converging sides of the cross-section of the wire prior to coiling must be made slightly narrower and the rounded portion slightly larger. Similarly, to obtain a diamond-shaped wire in the insert, the outer angle must be made slightly narrower prior to coiling and the inner angle slightly wider. The difference required depends on various factors, particularly on the height of the wire cross-section and the diameter of the coil.

Before the coiling, any cast of the wire occurring as hereinbefore explained owing to the original winding of the wire on a drum or reel of relatively small diameter and owing to other causes for a lack of uniformity, must be removed or at least so far removed that the wire will be free from twist over an appreciable length. This can be accomplished by passing the wire through straightening rollers grooved according to its cross-section. The wire so treated may then be wound on drums or reels of relatively very large diameter to avoid strain on the wire, which is now ready to be worked in the desired insert 10 such as illustrated in Figs. 1 and 2. For this purpose the free end of the wire is gripped and held straight so as to form the tang 11 shown in Fig. 2; then by rotating the gripped end the wire is coiled, while it is guided interiorly and exteriorly, into the shape the insert is intended to take when in position between the thread grooves of a threaded female and a threaded male member. Approximately the first convolution 12 may be slightly narrower than the remainder of the convolutions of the insert. The guiding is required not only in order to obtain the desired inner and outer diameters and pitch, but also in order to prevent the wire from tilting; or in other words, to insure that the line of symmetry of any cross-section of the wire coincides with a radius of the coil. When a length of wire sufficient for one insert has been coiled, the wire is cut off at 13 preferably at a slant with respect to the wire axis in order to produce a sharp edge which may engage the material of the female member after the insertion. If cutting of the wire takes place before the insert is finished, any remaining straight wire portion in front of the edge is also coiled in order to complete the product. When the torque applied to the tang in coiling the wire is released and the finished insert is also free in other respects, it will spring to an outer diameter larger than that it had during the coiling. This larger diameter can be used as a measure in gauging the insert in respect to both the required dimensions and the required elastic properties of the material. This is important because the friction of the wire will be inadmissibly high if the diameter of the free coil is too large, and the desired wedging action of the wire between the convolution flanks of the tapped thread of the female member will be too low if that diameter is undersized. Finally, the insert may be notched as at 14 near the root of the tang in order to facilitate the removal of the latter after the insertion of the coil.

Figure 3:
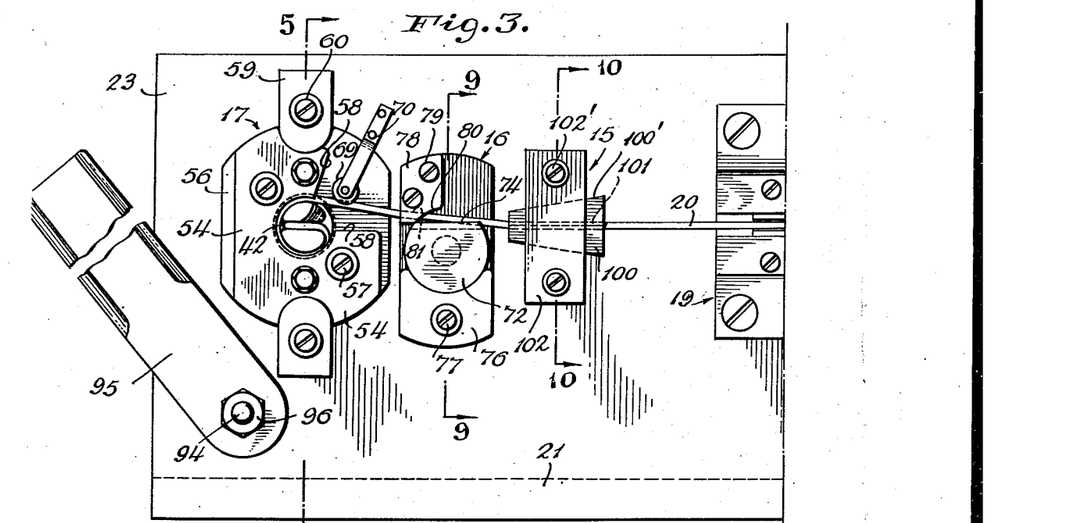
Fig. 3 is a front elevation of a portion of a machine for making inserts according to my invention, which portion comprises a wire guide, a cutter and the coiling device.
Figures 4, 7, 8, 9, 11, 11A:
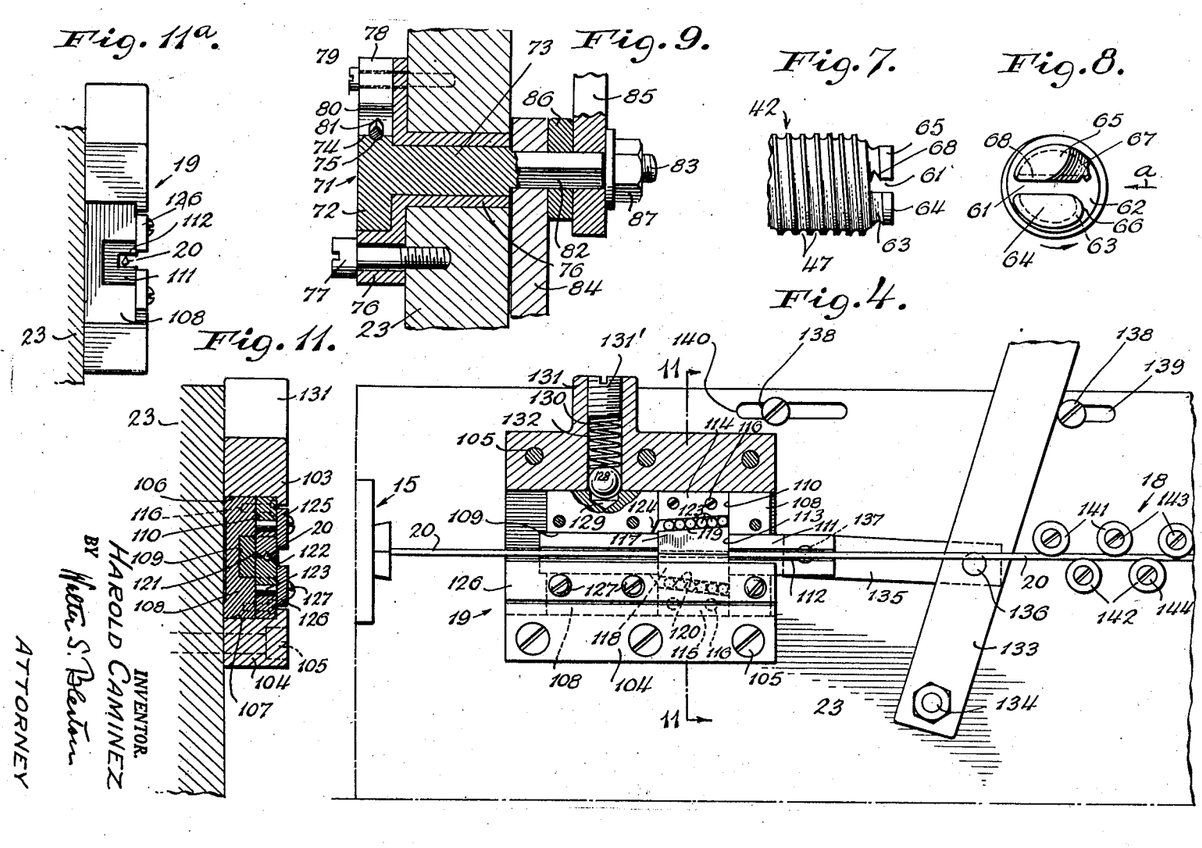
Fig. 4 is a front elevation partly in section of another portion of the same machine, comprising wire straightener and feeder mechanism.
Figs. 7 and 8 are a side elevation and a front elevation respectively of the front portion of the mandrel of the coiling device.
Fig. 9 is a section along line 9—9 of Fig. 3 and illustrating the cutter.
Fig. 11 is a section along line 11—11 of Fig. 4 showing the feeder.
Fig. 11a is a side elevation of the latter.

An example of a hand-operated machine for making inserts and according to my invention is shown in Figs. 3 to 11 of the drawings. This machine comprises wire guide 15, cutting mechanism 16 and coiling mechanism 17 (Fig. 3), and also wire straightener 18 and feeder 19 (Fig. 4). The two last-mentioned mechanisms 18 and 19 may be omitted if care is taken that the wire 20, of which the inserts are to be made, is straight and free from cast and if it is intended to feed the wire by hand. However, the use of a mechanical feeder such as 19 is advisable in order to insure that in starting the coiling of an insert the correct length of wire is advanced into the coiling mechanism. The mentioned mechanisms 15 to 19 may be mounted on a common frame 21 comprising a standard 22 and an upright mounting plate 23 as clearly shown in Fig. 5. Standard 22 and plate 23 carry the bearings 24 and 25 respectively for the coiling mechanism and its drive. For this purpose, standard 22 has a bore 26, and a bushing 27 is inserted into said bore and secured to the standard by means of bolts 28. The bushing is interiorly recessed near its ends so as to receive ball bearings 29 and 30 whose inner races 31 and 32 are mounted on a shaft 33 and spaced from each other by a sleeve 34. A flange 35 at the one end of shaft 33 bears against the race 30, whereas the other end of the shaft is threaded at 36 to receive thereon a nut 37. A spacing ring 38 bears against the other race 31 and a crank 39 is keyed to the shaft at 40 and held in position by said nut 37. Shaft 33 is hollow for at least a length sufficient to receive and hold in a bore 41 a mandrel 42 axially movable therein and splined thereto by means of a key 43 engaging a groove 44. A ring 45 with set screw 46 and adapted to abut against flange 35 may be so adjusted as to limit the length with which the mandrel 42 may be shifted into the interior of the shaft 33. Now, it will be clear that the mandrel 42 can be rotated by turning crank 39 and that it is free to move axially within limits defined in the one direction by ring 45 during such rotation.

Means are provided in order to shift the mandrel axially during its rotation according to the pitch of an insert to be coiled on the mandrel. For this purpose, its forward portion is threaded at 47 and the pitch and preferably also the shape of the threading are in accordance with those of such insert. This threaded portion is in engagement with a stationary nut structure which now will be described. Upright frame plate 23 has a bore 48 co-axial with the bore 26 of standard 22. A sleeve 49 is inserted in bore 48 and bears with an integral flange 50 against the front face of plate 23. Inside sleeve 49 a bushing 51 is arranged and interiorly threaded at 52 according to the pitch and shape of the insert to be made on the machine. A wire coil 53 substantially of the length of bushing 51 and of the same type as such insert is wedged in the threading 52 and in engagement with the threading 47 of mandrel 42. Thus, if crank 39 is turned to rotate mandrel 42 the latter will be screwed forward or backward, depending on the sense of rotation, owing to its engagement with the nut constituted by the coil 53 held stationary in bushing 51.

In front of bushing 51 a die 54 is provided which is interiorly threaded at 55 in the same manner as the bushing at 52. The die has a flange 56 with which it bears against flange 50 of sleeve 51. The die also engages the interior of sleeve 49 so as to be properly centered therein. A set of bolts 57 is provided so as to connect releasably the die 54 and bushing 51 in such a position relatively to each other that the interior threading of the die constitutes the true and exact continuation of the interior threading of the bushing. Clamping means 59 with bolts 60 engage flange 56 and secure the assembly of sleeve 49, bushing 51 and die 54 to the frame plate 23. Now it will be clear that a helical space is free between the front portion of the mandrel and the die owing to the fact that both are threaded according to the pitch and cross-section of the wire of which an insert is to be coiled with the aid of the machine, and that the coil 53 does not extend into the die. Furthermore, it will be clear that the die 54 which is preferably hardened does not only serve to guide the wire in a sense to prevent tilting of the convolutions during the coiling, but that it also calibrates the wire, i. e., acts as a drawing tool to shape the cross-sections of the convolutions correctly particularly if the wire cross-section is originally slightly oversized. Care is taken that the wire to be coiled can be supplied to such helical space, close to the bushing 51 and in a plane substantially at right angles to the axis of the mandrel. For this purpose, the die is recessed at 58 as clearly shown in Fig. 3. However, it will be noticed that the major portion of the periphery of a portion of the mandrel is encompassed by the die, so as to insure the above-mentioned action of the latter.

In order to grip the end of a wire to be coiled, the front end of the mandrel is slotted diametrically at 61. As shown in Figs. 7 and 8 the slot 61 leads with its one end 62 into the groove of the first convolution 63 of the mandrel threading, and this convolution is narrower than the remainder so as to produce the convolution 12 of the insert shown in Figs. 1 and 2. Furthermore, the end 62 is slightly flared so as to facilitate the entering of the wire in the radial direction of arrow $a$ in Fig. 8. Owing to the slotting of the mandrel its end forms two projections 64 and 65. One of the projections, in the drawing projection 64, is well rounded at 66 where the bend between the tang 11 and the first convolution 12 is to be formed. Opposite the rounding at 66 the other projection is slanted down at 67 to the bottom of the slot for a purpose to be explained hereinafter. Furthermore, that flank of the slot which is part of projection 65 may be provided with a groove 68 according to the shape of the wire portion intended to engage the threading 55 in the die 54. Groove 68 serves to prevent the wire from tilting in slot 61. As stated above, the die is to be so adjusted with respect to the threaded bushing 51 that the thread groove convolutions 55 of the die 54 are exactly opposite the groove convolutions 47 of the mandrel. Furthermore, the sector recess 58 of the die is so located that the wire 20 may be inserted through it into the slot 61 when the mandrel is in its end position defined by the setting of ring 45, and that the wire portion between the mandrel and the cutter mechanism 16 can take the tangential position with respect to the mandrel as shown in Fig. 3. Substantially within the sector 58, a little guide roller 69 is preferably arranged very close to the mandrel to prevent a wire end severed by the cutting mechanism from swinging upward in Fig. 3. This roller 69 is journaled in a bracket 70 secured to the front wall 23.

It will be understood that the illustrated structure of the bushing 51 with coil 53, die 54 and mandrel 42 may be modified, it being essential only that the thread pitch of the bushing and the portion of the mandrel in engagement therewith is equal to that of the die 54 and the cooperating portion of the mandrel. However, the illustrated structure is the preferred one because it requires a mandrel threading of only one and the same type so that bushing and die may be arranged close to each other regardless of the length of the insert to be coiled. Furthermore, only the die need be hardened; whereas the bushing may be made of ordinary material because the coil 53 can be easily replaced when worn in order to insure accurate working of the machine. Furthermore, it will be clear that the same coiling mechanism can be used for inserts of different diameters within certain limits and of different wire cross-sections, except for the mandrel, bushing and die which may be easily exchanged according to the desired shape and dimensions of a desired insert.

Figure 6:
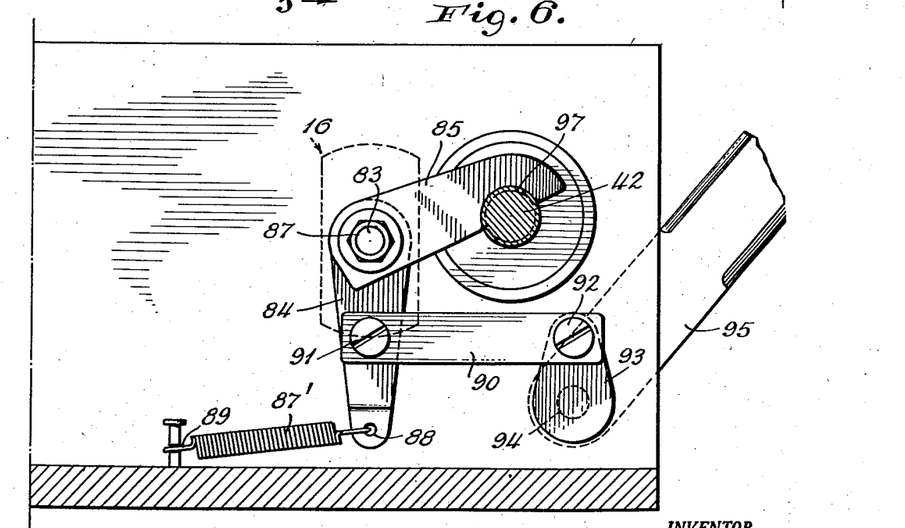
Fig. 6 is a section taken along line 6—6 of Fig. 5 and showing the rear of the coiling device.

The cutting mechanism clearly shown in Figs. 3, 6 and 9 is of a type which will cut the wire slantingly with respect to its axis in order to produce the edge 13 of Fig. 2. It is immaterial in this respect whether the face formed by such cutting is plane or curved. In the illustrated embodiment, the mechanism comprises the cutter 71 consisting of disc 72 of a segment greater than a semi-circle with a shank 73. The flank 74 of the disc constituting the chord of the segment is grooved at 75 so as to guide the wire 20 passing over it towards the recess 58 when the wire end is to be inserted into the slot of the mandrel as it will be described hereinafter. Shank 73 is journaled in a bushing 76 in the wall 23, the bushing being secured to the wall 23 by means such as bolt 77. A hardened piece 78 is also attached to bushing 76 and wall 73 by means of bolts 79 so as to cooperate with the cutter disc 72. Piece 78 has an arcuate face 80 according to the arcuate circumference of the disc 72 and is grooved at 81 to guide the wire in the position of Fig. 3. Hence, it will be clear that if the cutter is turned clockwise in Fig. 3 the wire will be severed between the disc 72 and piece 78 slantingly with respect to the wire axis whereby the sharp edge 13 of the insert of Figs. 1 and 2 will be formed. Shank 73 has a square cross-sectional extension 82 with a threaded end 83. On extension 82 there are mounted a lever 84 and a rockable abutment 85 with a distance piece 86 between the two. A nut 87 on the threaded end 83 holds the members 84 to 86 in position and prevents the shank 73 from axial movement. A spring 87' attached to the end 88 of lever 84 and to the frame at 89 tends to turn the cutter shank 73 clockwise in Fig. 6 into the inoperative position of Fig. 3. Intermediate the shank and the end 88, a connecting rod 90 is linked to lever 84 at 91. The other end of rod 90 is linked at 92 to a crank 93 which is journaled with its shaft 94 in wall 23. On the front side of wall 23 a hand lever 95 is secured to shaft 94 by means of nut 96. The abutment piece 85 is of such a length as to be able to bear on mandrel 42 and is semicircularly recessed at 97 for this purpose. Set nuts 98 and 99 in engagement with the threading of mandrel 42 as shown in Fig. 5 are provided for cooperation with the abutment piece 85. The various parts are so adjusted that if spring 87' has pulled lever 84 to its end position in which the piece 85 bears on mandrel 42, the cutting disc 72 is in the position of Fig. 3 so that wire 20 may pass between the chord surface 74 of the disc and piece 78. In this position the abutment 85 prevents mandrel 42 from being projected towards the right-hand side in Fig. 5 beyond the point when the set nut 98 engages the rear face of the abutment 85. If, however, lever 95 is pulled clockwise in Fig. 6, lever 84 is pulled anticlockwise against the restraint of spring 87' by the intermediary of crank 93 and connecting rod 90. Thereby, the cutter disc 72 will be operated to sever the wire, and simultaneously the abutment piece 85 will be lifted and will be entirely out of the path of nut 98 when the cutting operation has been completed, thus to permit further rotation and projection of the mandrel until nut 98 abuts against the rear face of bushing 51.

Means are provided to guide the wire towards the cutter in correct position, i. e., in the case of an insert as shown in Figs. 1 and 2 with the apex of its cross-section outward. Such means in general denoted with the reference character 15 are shown in Figs. 3 and 10. In the illustrated embodiment they comprise a two-part, wedge-shaped member 100, 100' whose parts are so grooved at 101 in their faces fitting upon each other that the combined groove exactly corresponds to the shape of the wire. In this manner, the guide member 100, 100' is simultaneously useful as a gauge for the wire. Member 100, 100' is held to the wall 23 by means of a channeled piece 102 with interior taper according to the wedge faces of member 100, 100', piece 102 being fastened to the wall 23 by screws 102', in proper relationship to the cutting mechanism 16.

Means may be provided to feed a wire into the slot 61 of the mandrel in order to start coiling of an insert. Such means in general denoted by 19 are clearly shown in Figs. 4, 11 and 11a. In reading these figures it is to be noted that the cover strip 125 hereinafter described and shown in Fig. 11 is removed in Fig. 4 in order to better show the parts in the rear of such strip. The feeding mechanism comprises two guide pieces 103 and 104 attached to the frame plate 23 by means of bolts 105. Pieces 103 and 104 form channels 106 and 107 together with the wall 23. A plate 108 engages the channels 106 and 107 and is freely movable therein in longitudinal direction. The plate is provided with a longitudinal groove 109 of substantially square cross-section and with a transverse recess 110. In groove 109, a bar 111 is movable which has a longitudinal groove 112 to receive therein the wire 20 freely movable in lengthwise direction. Bar 111 has a transverse recess 113 similar to the recess 110 of plate 108. In recess 110 wedge-shaped pieces 114 and 115 are secured by screws 116, and jaws 117 and 118 are inserted in the recess 113 of bar 111. The jaws have outer wedge faces 119 and 120 respectively opposite the wedge faces of the pieces 114 and 115, the inner faces 121 and 122 grooved in accordance with the cross-section of the wire so as to clamp the wire when the jaws are urged towards each other. Rollers 123 are inserted between the piece 114 and jaw 117 and between piece 115 and jaw 118. Now, it will be clear that by urging either bar 109 with jaws 117 and 118 to the left relatively to the plate 108 with pieces 114 and 115, or conversely by urging plate 108 to the right relatively to the bar 109 a wedging action will occur by the intermediary of the rollers 123 so that the jaws will firmly clamp the wire and will take it along when the movement continues. In the illustrated embodiment, the arrangement is such that bar 111 will be shifted relatively to plate 108 towards the left-hand side in Fig. 4, in order to effect the wedging of the rollers 123 and thus to take plate 108 along. For this purpose, the recess 110 of the plate is so shaped at 124 that the jaws 117 and 118 have sufficient space to accomplish the required relative movement. If, however, the bar 111 is shifted from wedging position towards the right relatively to plate 108, the wedging force will be released and the plate will be taken along by the bar when the jaws 117 and 118 abut against the right-hand flank of the recess 110. In order to hold the jaws 117 and 118 with rollers 123 and also the bar 111 in the respective recesses 113, 110 and in groove 119, two cover strips 125 and 126 are provided and secured to plate 108 by means such as bolts 127. It might happen that upon a movement of the bar 111 plate 108 is taken along before sufficient wedging occurs to clamp the wire 20 securely between the jaws 117 and 118. To insure such clamping action, braking means are provided which hold the plate back until a predetermined force is applied to overcome the braking effect. In the illustrated embodiment these means comprise a ball 128 which engages an indentation 129 in the top face of plate 108 when the bar 111 is in such relative position that no wedging action takes place, i. e., in its right-hand end position relatively to the plate. The ball 128 is vertically movable in a bore 130 of the guide member 103 which for this purpose has a projection. The bore 130 is closed by a screw 131', and the compression spring 132 is arranged between that screw and ball 128 so as to urge the latter against the top face of plate 108.

In order to actuate bar 111, a hand lever 133 is pivoted at 134 to the frame plate 23 and linked to the end of the bar by means of a rod 135, the latter being connected to the lever and bar by means of pivot pins 136 and 137. Abutments 138 adjustable in slots 139 and 140 of frame plate 23 may be provided to limit the movement of lever 133 according to the requirements of the feed of the wire 20.

In order to insure straightness of the wire 20 when being fed to the coiling mechanism, straightening means 18 may be provided which in the present case comprise an upper and a lower set of rollers 141 and 142 in staggered relation. The rollers may be grooved according to the cross-section of the wire as it is well known in the art with respect to wire straighteners. The rollers 141 and 142 are pivoted on sets of pins 143 and 144 respectively, secured to the frame wall 23.

The machine operates in the following manner: First, the mandrel 42 is brought in such a position by turning crank 39 that the slot 61 facing with its end 62 the recess 58 of the die 54 is exactly in line with the path of the wire from the guide 15 and cutting mechanism 16. In this position of the mandrel, ring 45 is to be adjusted to abut against the flange 35. Owing to spring 87', lever 95 is in its left-hand (Fig. 6) end position in which abutment 85 rests on the mandrel 42 and the cutter disc 72 is in its inoperative position. The lever 133 of the feeding mechanism is in its right-hand end position (Fig. 4) in which it bears against the right-hand abutment 138, the latter being so set in slot 139 that simultaneously ball 128 engages the indentation 129 and the jaws 117 and 118 abut against the right-hand flank of the recess 110.

Then the end of a wire of the required cross-section which as stated above slightly differs from the desired cross-section obtained by coiling it, is passed between the rollers 141, 142 of the straightener 18 through the groove 112 of the bar 111 of the feeding device 19, through the groove 101 of the wire guide 15 and between disc 72 and piece 78 of the cutting mechanism 16 so that a short length projects therefrom. This length is cut off by actuation of lever 95 and removed in order to set the various mechanisms for proper cooperation. Thereafter, lever 133 is pushed to the left taking along bar 109 with jaws 117 and 118 while plate 108 is retained by ball 128. Owing to the wedging action thus occurring in the clamping device 114 to 123, the jaws 117 and 118 will firmly settle on the wire 20. When the clamping action has become strong enough to prevent slipping of the jaws on the wire, the shifting force overcomes the restraint of ball 128 and the entire mechanism of plate 108, bar 109 and the clamping device will be taken along so as to shift the wire to the left (Fig. 4) through the wire guide, and cutter mechanism, and with its free end through die recess 58 into the mandrel slot 61. To accomplish this, lever 133 is pulled to the left until the free wire end projects a desired length into the slot 61 to form the coil tang 11. In this position of lever 133 the left-hand abutment 138 is adjusted in slot 140. Then lever 133 is returned to its right-hand position whereby the clamping and wedging action of the jaws is eased so that subsequently the wire may pass the feeding device without appreciable resistance.

Thereafter crank 39 will be turned so that the mandrel will be rotated in anti-clockwise direction in Figs. 3 and 8. This causes the wire end to be bent into the mandrel groove 63 and further takes it into the threading 55 of the die, simultaneously lifting it into engagement with roller 69. Further rotation coils the wire between the die and the mandrel on the latter thereby shaping the insert exact as to desired diameters, pitch and cross-section of the convolutions. When so much wire has been coiled that the short piece between the cutting device and the point where the wire enters the die will be sufficient to complete an insert of desired length, rotation will be halted and the set nuts 98, 99 will be adjusted to abut against the abutment piece 85. Then lever 95 will be actuated whereby the cutting disc 72 will be turned so as to sever the wire by cooperation with piece 78, and simultaneously the abutment piece 85 will be lifted to permit continuation of rotation of the mandrel. Upon further rotation the end of the insert will be formed wherein the roller 69 is instrumental in preventing the ultimate end of the insert from comprising a short, straight rather than arcuate portion which I have found otherwise tends to form, probably owing to the resiliency of the wire end. The width of the abutment 85 and thus the distance the adjusted nut 98 may be moved in axial direction before abutting against bushing 51 is so selected that not only the free end of the insert can be shaped but that the completed insert will be screwed out of the die 54 by the rotation of the mandrel. As soon as the insert is free from the die it springs, owing to its resiliency, to a diameter larger than that with which it was coiled. This causes the insert convolutions to leave the thread groove of the mandrel, and simultaneously causes a torque tending to turn the insert in the direction in which it was coiled. Owing thereto, the bend originally formed at the root of the tang will engage the slant 67 of the mandrel end projection 65 shown in Fig. 8 and will thereby be pushed forward so that the tang leaves the slot 61. Frequently, the sudden release of the insert from the die is sufficient to propel the insert so as to fall off the mandrel. In other cases, the insert when free from the die will be stripped off the mandrel by turning the crank 39 in the opposite direction whereby the mandrel will be restored to its original position in which now ring 45 abuts against flange 35. During this step, nuts 98, 99 are retracted underneath abutment 85 together with the mandrel, and the abutment 85 will be pulled back by spring 87' into engagement with the mandrel. Simultaneously the cutting disc 72 will be restored to its original position as soon as the nut 98 has cleared the path of the abutment. It will be noticed that the free end of the wire 20 resting on the face 74 of the cutter disc 72 is bent slightly upward from the guide 15. However, such bending is within the elastic limits of the wire so that it follows the face 74 when the cutter disc is returned to its inoperative position. With lever 95 thus in its original position, and mandrel 42 retracted to its end position determined by ring 45, the machine is ready to form another insert in the same manner as hereinbefore described wherein, however, it is not necessary to reset any one of the adjusted parts such as 45, 98, 99, 138 as long as the machine is intended to produce inserts of the same type.

Figure 12:
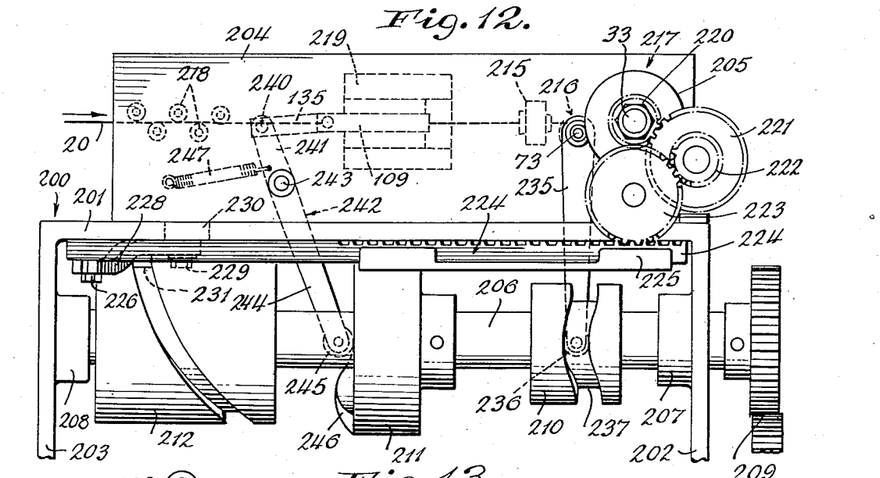
Figs. 12 and 13 are a side elevation and top plan view respectively of an automatic machine embodying the same principles as the hand-operated machine illustrated by Figs. 3 to 11.
Figures 13, 14:
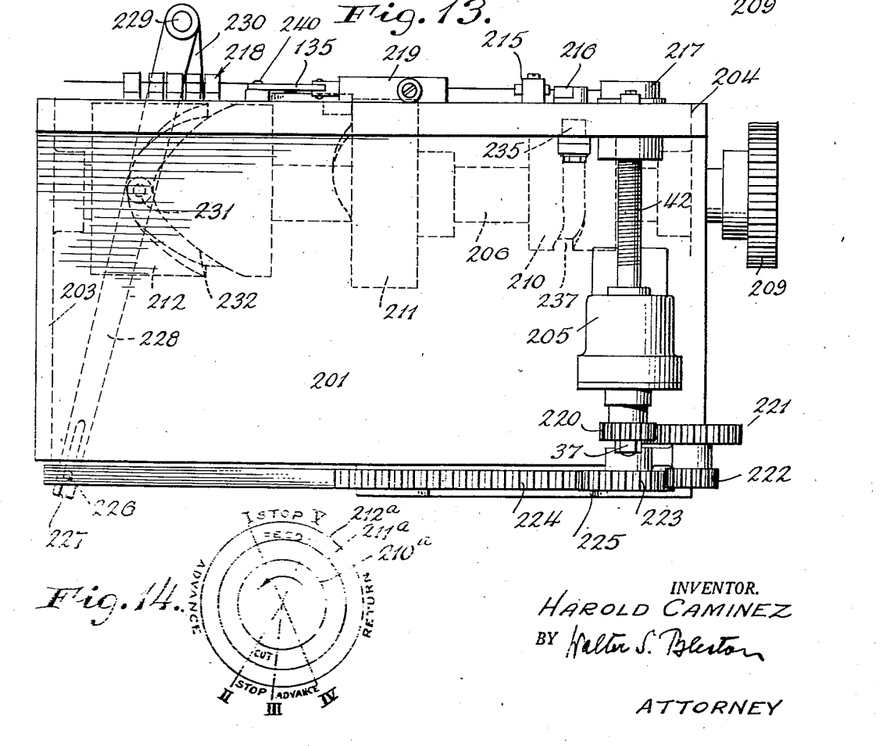
Fig. 14 is a cam diagram referring to the machine of Figs. 12 and 13.

An automatic machine operating according to the same principle as the machine hereinbefore described is diagrammatically illustrated in Figs. 12 and 13. This machine comprises a supporting structure 200 including a table 201, side frame members 202 and 203, front plate 204 and standard 205. A main shaft 206 is journaled in bearings 207 and 208 in connection with the frame members 202 and 203 underneath the table 201. The drive of this shaft is indicated at 209. Three cam members 210, 211, 212 are secured to the shaft 206 in order to actuate the various mechanisms of the machine in a predetermined, timed relationship to each other. These mechanisms and additional devices are similar to those mentioned in the description of the hand-operated machine and comprise the wire straightener 218, the feeding mechanism 219, the wire guide 215, the cutting mechanism 216 and the coiling mechanism 217, all of which may be substantially similar as to structure and function to the parts 18, 19, 15, 16 and 17 respectively. The enumerated mechanisms and devices are attached to the front plate 204.

The wire straightener 218 comprises parts such as illustrated in Fig. 4 and denoted by the reference characters 141 to 144, and the wire guide 215 comprises parts such as illustrated in Fig. 3 and denoted by reference characters 100 to 102'. The coiling mechanism 217 is designed substantially in the same manner as the mechanism illustrated in Figs. 3, 5, 7 and 8 and comprising the parts 27 to 70 with the exception, however, of the abutment ring 45 and 46 which is not required in the automatic machine. Neither are there nuts 98 and 99 nor abutment member 85 required in the mechanism 217. Also the crank 39 of Fig. 5 is lacking but replaced by a gear wheel 220 on shaft 33. Means are provided to drive wheel 220 in the one and the other direction according to a predetermined cycle as it will be explained hereinafter. For this purpose, wheel 220 is in engagement with a train of wheels 221, 222 and 223 which may be exchangeable in order to change the number of revolutions impressed on the mandrel 42 in the course of a cycle. Wheel 223 meshes with a rack 224 which is reciprocatably arranged along the side of the table 201 in guide rails 225 and which is provided near its one end with a pin 226 engaging the forked end 227 of a lever 228. This lever is pivoted at 229 to an extension 230 of table 201 and carries, intermediate its ends, a roller 231 which engages a cam groove 232 of the afore-mentioned cam member 212 on the main shaft 206. The cam groove 232 is so cut that upon one revolution of the shaft 206, the roller 231 is first advanced in the one direction, then stopped, again advanced a short distance, thereafter returned to its original position, and finally held stationary for a certain time until the end of the shaft revolution, whereupon the cycle is repeated with each subsequent revolution. Now, it will be clear that when shaft 206 is turned the cam mechanism causes an intermittent reciprocating movement of lever 228, which movement is transformed into an intermittent reciprocating rotary movement of the mandrel by means of the rack 224 and the gear wheels 220—223.

The cutting mechanism 216 differs in the illustrated automatic machine from the mechanism 16 of Figs. 3, 6 and 9 only insofar as a lever 235 is substituted for lever 84 secured to the shank 73 of the cutting disc 72, and as the parts 87' to 95 are dispensed with. To the free end of lever 235, a roller 236 is pivoted which engages groove 237 of the cam member 210. The cam groove 237 is so formed that during a short portion of one revolution of the shaft 206 the lever 235 is swung once forward and backward so as to actuate the cutter and to return it to inoperative position.

The feeding mechanism 219 may be entirely equal to the mechanism 19 of Fig. 4; only the parts for actuating the feeder differ therefrom in that the rod 135 is linked at 240 to the upper arm 241 of a lever 242 which is pivoted to the wall 204 at 243. The lower arm 244 of the lever is provided with a roller 245 bearing against the cam face 246 of the cam member 211. A tension spring 247 attached to the lever arm 241 with its one end and to the front plate 204 of the frame with its other end insures permanent contact of the roller 245 with the face 246 which is so shaped that lever 242 is reciprocated once during a portion of each revolution of shaft 206 thereby actuating the feeding mechanism 219.

Fig. 14 diagrammatically illustrates the setting of the cam members 210, 211 and 212 with respect to each other. The cam members are represented by the circles 210a, 211a and 212a respectively, and the arrow interiorly of the circle 210a indicates the sense of the continuous rotation of shaft 206. Starting from point I, it will be seen that as far as point II only cam member 212 is operative in advancing the rack 224 and thereby causing rotation of the mandrel 42 for coiling an insert. Between points II and III the cam members 212 and 211 are inoperative with respect to their associated coiling and feeding mechanisms respectively, whereas the cutter will be operated by cam member 210 turning lever 235. From point III to IV again only cam member 212 is active in finishing the coiling of the insert. From point IV to V cam member 212 returns the rack and, thus, the coiling mandrel 42 to their original position. From point V to point I, finally, the cams 212 and 210 are inoperative whereas cam 211 actuates the feeding mechanism 219 so that at point I the forming of a subsequent insert may start. It will be understood that the various lengths of the arcs between the points I to V of the diagram are selected merely by way of example and that other relative lengths of the arcs may be desirable or necessary in each individual case depending on the type of insert to be shaped and the specific design of the mechanisms operated by the cams. Hence, the diagram indicates rather the sequence of the steps of operation than the relative duration of such steps. Furthermore, it will be clear that if for any reason cam 212 is exchanged in order to provide cycle periods of other relative lengths, cams 210 and 211 do not need to be altered but may be readjusted on shaft 206 so that their operation periods coincide with the new stop periods respectively of the exchanged cam 212.

From the foregoing it will be clear that the machine illustrated in Figs. 12 and 13 automatically performs substantially the same operations as the machine of Figs. 3 to 11 when the latter is manipulated as described. In order to start the automatic machine correctly, it is advisable to turn the shaft 206 by hand forward to a position intermediate points I and II and to insert the wire from the left in Fig. 12 through the devices 218, 219, 215 and 216 until a short length projects from the cutter. The shaft is then turned to point III whereby the short length is cut off which is to be removed. Now, the machine may be started, i. e., the drive may be actuated. The machine will then idle from point III to point V whereupon the automatic feeding will start the continuous production of inserts.

I claim:
1. In a machine for coiling inserts for screw connections, the combination of a rotatable mandrel provided with a thread groove of a pitch according to that of an insert to be coiled thereon, means to rotate said mandrel, a stationary nut-like structure in engagement with a first portion of the mandrel threading and a stationary member in cooperative relation to a second portion of the mandrel threading so as to engage from the outside convolutions of a wire coiled on said mandrel in said groove, and thereby to prevent tilting of the wire convolutions during the coiling, said nut-like structure comprising a stationary support, a bushing secured to said support, said bushing being interiorly threaded according to the threading in the female member of a screw connection for which the insert to be coiled by the machine is destined, and a wire coil of the type of such insert being inserted in said bushing so as to engage the theading of said bushing and that of said mandrel.

2. In a machine for coiling wire inserts for screw connections, the combination of a rotatable mandrel provided with a thread groove of a pitch according to that of an insert to be coiled thereon, and of a cross-section according to the inner portion of the cross-section of a convolution of said insert, means to rotate said mandrel, means to shift said mandrel in axial direction according to said pitch upon rotation of said mandrel, and a stationary die-like member with an interior thread groove over at least a portion of the inner circumference of said member, said interior thread groove having a pitch according to that of the mandrel and a cross-section according to the outer portion of the cross-section of a convolution of said insert, and being in opposition to said thread groove of said mandrel.

3. A device as claimed in claim 2, wherein said die-like member is in the shape substantially of a laterally recessed nut, and means to mount said mandrel for circumferential and axial movement within said die-like member and accessible through the recess of the latter from the outside.

4. A device as claimed in claim 2, wherein said mandrel has a free and substantially diametrically slotted end, the slot of said end communicating on the one side with the thread groove of said mandrel so that a wire inserted into said slot may be coiled into the thread groove of the mandrel when the latter is rotated, and one flank of the slot being beveled to facilitate removal of a finished insert coil from the mandrel end.

5. In a machine for coiling wire inserts for screw connections, the combination of a rotatable and axially shiftable mandrel provided with a thread groove of a pitch according to that of an insert to be coiled thereon, means to rotate said mandrel, stationary and interiorly threaded means in engagement with said mandrel to shift the latter in axial direction according to said pitch upon rotation of the mandrel, an interiorly threaded and laterally recessed die member, the threading of said die member being of the same pitch as that of the mandrel and constituting the continuation of that of said interiorly threaded means, the cross-sections of the thread grooves of said mandrel and of said die member being so shaped as to complement each other to the cross-section of a convolution of said insert, means to guide a wire towards the recess of the die member, a cutting device on that side of said die member from which the wire is fed, means for actuating said cutting device, removable means for stopping rotation after a predetermined number of revolutions of the mandrel, and a connection between the two last-mentioned means, whereby said stopping means are removed from operative position when said cutter device has been actuated.

6. A device as claimed in claim 5, wherein said cutting device includes a cutting edge having a path of movement substantially at an angle to the axis of the wire which is fed to said mandrel.

7. A device as claimed in claim 5, wherein said stopping means comprises a member adjustably secured to said mandrel and an abutment member connected to said actuating means and having a stopping position in which it projects into the path of said member secured to said mandrel.

8. A device as claimed in claim 5, further comprising abutment means for the wire close to the recess of said die member to guide a wire end after the cutting in tangential direction with respect to the thread groove of the mandrel.

9. A device as claimed in claim 5, wherein at least part of said guiding means constitutes a gauge for the wire.

10. A machine for coiling wire inserts for screw connections, the combination of a mandrel having a front portion provided with a thread groove and a front end provided with a diametrical slot communicating with said groove, means in connection with said mandrel to cause a helical movement of it about its axis, an interiorly threaded die member with a passage to its inside for a wire to be coiled, said mandrel being arranged with its front portion inside of said die member and being movable between a first end position in which said front portion at least partly protrudes from said die member and a second end position in which said slot is in registry with said passage, the pitch of the mandrel threading, of the die member threading and of said helical movement being according to that of the insert to be produced, the cross-sections of the thread grooves of the mandrel and of the die member being so shaped and arranged as to complement each other to the cross-section of the convolution of said insert, a wire cutting device, means to actuate said cutting device, and means in connection with the last-mentioned means to prevent said mandrel from completing movement from its first to its second end position during the operation of said cutting device.

11. A machine for coiling wire inserts for screw connections comprising a wire-coiling mechanism including a mandrel, a wire cutting mechanism, means to guide a wire to said cutting mechanism and on to said coiling mechanism, a driving shaft for uni-directional rotation, first transmission means between said shaft and said coiling mechanism whereby said mandrel is reciprocated in a cycle having a first period of rest in which to feed the wire, a second period of advance movement, a third period of rest, a fourth period of advance movement, and a fifth period of return movement, and a second transmission means between said shaft and said cutting mechanism for intermittent actuation of said mechanism, said second transmission means being so arranged as to its period of operation that said cutting mechanism is actuated during said third period of said cycle.

12. A machine for coiling wire inserts for screw connections comprising a wire coiling mechanism, a wire cutting mechanism, means to guide a wire to said cutting mechanism and on to said coiling mechanism, said coiling mechanism including a threaded mandrel and a stationary nut structure in engagement with said mandrel, a driving shaft, a first reciprocating transmission means between said shaft and said mandrel and including a first cam member to cause a cycle of the mandrel movement having a first period of rest in which to feed the wire, a second period of advance movement, a third period of rest, a fourth period of continued advance movement, and a fifth period of return movement, and a second transmission means between said shaft and said cutting mechanism and including a second cam member so constructed and arranged with respect to said first cam member as to actuate the cutting mechanism during said third period.

13. In a machine for coiling inserts the combination of a mandrel provided with a helical thread groove of a shape substantially according to the inner portion of the cross-section of a wire to be coiled on said mandrel, means to rotate the mandrel, means to guide the mandrel for movement in axial direction of the mandrel, and a hollow stationary member encompassing a major portion of the periphery of a portion of said mandrel and being provided with an interior helical thread groove of a cross-section substantially complementing the cross-section of the groove of the mandrel to that of said wire, and having a pitch equal to that of the thread groove of the mandrel.

14. In a machine for coiling wire inserts for screw connections, the combination of a rotatable mandrel provided with a thread groove of a shape substantially according to the inner portion of the cross-section of a wire to be coiled thereon, means to rotate said mandrel, a stationary nut-like structure provided with an inner threading corresponding to the mandrel threading and being in engagement with a first portion of the latter so as to cause axial shifting of the mandrel while the mandrel rotates, and a hollow stationary member encompassing at least part of a second portion of the mandrel and being provided with an interior thread groove of a cross-section substantially complementing the cross-section of the groove of the mandrel to that of said wire, and having a pitch equal to that of the thread groove of the mandrel, said nut-like structure and said hollow stationary member being axially aligned so that the threading of the latter is in continuation of the former.

HAROLD CAMINEZ.